United States Patent
Matsuyama

(10) Patent No.: US 12,240,509 B2
(45) Date of Patent: Mar. 4, 2025

(54) FAILURE DETERMINATION DEVICE, BRAKE CONTROL DEVICE, AND FAILURE DETERMINATION METHOD

(71) Applicant: Mitsubishi Electric Corporation, Tokyo (JP)

(72) Inventor: Etsuji Matsuyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 212 days.

(21) Appl. No.: 18/041,637

(22) PCT Filed: Oct. 20, 2020

(86) PCT No.: PCT/JP2020/039344
§ 371 (c)(1),
(2) Date: Feb. 14, 2023

(87) PCT Pub. No.: WO2022/085065
PCT Pub. Date: Apr. 28, 2022

(65) Prior Publication Data
US 2023/0303137 A1    Sep. 28, 2023

(51) Int. Cl.
| | |
|---|---|
| *B61F 5/38* | (2006.01) |
| *B60T 8/17* | (2006.01) |
| *B61F 5/10* | (2006.01) |
| *B61F 5/44* | (2006.01) |
| *B61L 15/00* | (2006.01) |

(52) U.S. Cl.
CPC ........ *B61L 15/0081* (2013.01); *B60T 8/1705* (2013.01); *B61F 5/386* (2013.01); *B61F 5/44* (2013.01); *B61F 5/10* (2013.01)

(58) Field of Classification Search
CPC .... B61L 15/0081; B60T 8/1705; B61F 5/386; B61F 5/44; B61F 5/20; B61F 5/307
See application file for complete search history.

(56) References Cited

U.S. PATENT DOCUMENTS

2019/0054933 A1*   2/2019   Tanase ...................... B61F 5/10

FOREIGN PATENT DOCUMENTS

| JP | H06227392 A | 8/1994 |
|---|---|---|
| JP | 2017149272 A | 8/2017 |
| JP | 6444215 B2 | 12/2018 |

OTHER PUBLICATIONS

International Search Report (PCT/ISA/210) with translation and Written Opinion (PCT/ISA/237) mailed on Dec. 15, 2020, by the Japan Patent Office as the International Searching Authority for International Application No. PCT/JP2020/039344. (11 pages).

* cited by examiner

*Primary Examiner* — Jacob M Amick
(74) *Attorney, Agent, or Firm* — BUCHANAN, INGERSOLL & ROONEY PC

(57) ABSTRACT

A failure determination device includes an acquirer to acquire pressure values of air springs provided to bogies included in a vehicle to support a vehicle body included in the vehicle, a compensator to perform compensation of the pressure values of the air springs depending on the position of the vehicle, and a determiner to determine, based on the pressure values of the air springs compensated by the compensator, whether any failure occurs in the air springs.

18 Claims, 13 Drawing Sheets

FAILURE DETERMINATION DEVICE, BRAKE CONTROL DEVICE, AND FAILURE DETERMINATION METHOD

TECHNICAL FIELD

The present disclosure relates to a failure determination device, a brake control apparatus including the failure determination device, and a method for determining a failure.

BACKGROUND ART

Railway vehicles include vehicle bodies and bogies for supporting the vehicle bodies. In detail, the vehicle bodies are supported at multiple air springs provided to the bogies. For example, each of the vehicle bodies is supported at four air springs arranged two-dimensionally in both of the traveling direction and the width direction of the railway vehicle. Specifically, each of the two bogies disposed under the vehicle body and arranged in the traveling direction is provided with two air springs arranged in the width direction among the four air springs such that the air springs support the vehicle body. If any failure occurs in any of the air springs, the vehicle body loses the balance and adversely affects the running of the railway vehicle. In order to solve this problem, some railway vehicles are provided with a failure determination device to detect a failure in the air springs. A typical example of this type of failure determination device is disclosed in Patent Literature 1.

The air spring abnormality detection system disclosed in Patent Literature 1 deems any abnormality to occur in any of four air springs when the diagonal imbalance of a vehicle body calculated from the pressure values of the air springs is higher than a diagonal threshold value.

CITATION LIST

Patent Literature

Patent Literature 1: Japanese Patent No. 6444215

SUMMARY OF INVENTION

Technical Problem

The diagonal imbalance of the vehicle body inevitably increases while the railway vehicle is located on an inclined ground despite of no abnormality in the air springs. The air spring abnormality detection system disclosed in Patent Literature 1 thus deems no abnormality to occur in the air springs despite of the diagonal imbalance of the vehicle body higher than the diagonal threshold value, when the railway vehicle is supposed to be located on an inclined ground because the left-right imbalance of the vehicle body calculated from the pressure values of the four air springs is higher than a left-right threshold value. Thus, the air spring abnormality detection system disclosed in Patent Literature 1 cannot determine whether any failure occurs in the air springs while the railway vehicle is located on an inclined ground. In other words, the air spring abnormality detection system disclosed in Patent Literature 1 sometimes fails to determine whether any failure occurs in the air springs depending on the position of the railway vehicle. This phenomenon is potentially problematic in determination of occurrence of a failure in air springs included in not only railway vehicles but also moving bodies that can travel on inclined grounds.

An objective of the present disclosure, which has been accomplished in view of the above situations, is to provide a failure determination device, a brake control apparatus, and a method for determining a failure capable of determining whether any failure occurs in air springs even while a vehicle is located on an inclined ground.

Solution to Problem

In order to achieve the above objective, a failure determination device according to an aspect of the present disclosure includes an acquirer, a compensator, and a determiner. The acquirer acquires pressure values of a plurality of air springs provided to a bogie included in a vehicle to support a vehicle body included in the vehicle. The compensator performs compensation of the pressure values of the air springs depending on the position of the vehicle. The determiner determines, based on the pressure values of the air springs compensated by the compensator, whether any failure occurs in the air springs.

Advantageous Effects of Invention

The present disclosure achieves determination of whether any failure occurs in the air springs on the basis of the pressure values of the air springs compensated depending on the position of the vehicle, and can therefore determine occurrence of a failure in the air springs even while the vehicle is located on an inclined ground.

DESCRIPTION OF EMBODIMENTS

Figure 1:
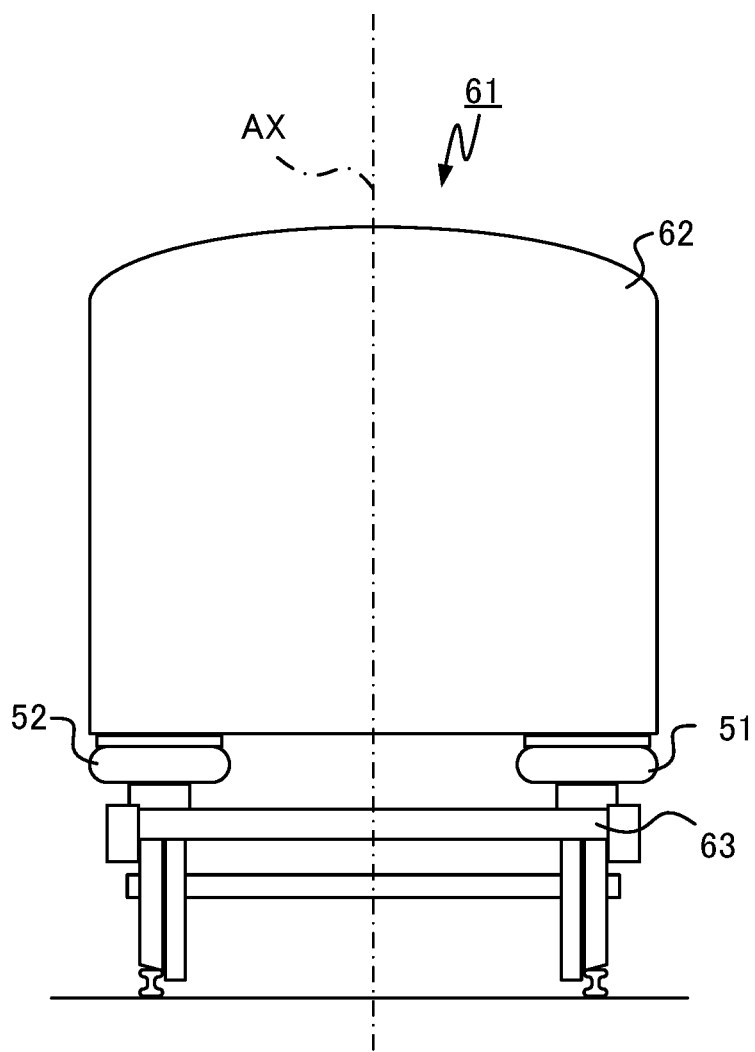
FIG. 1 is a front view of a vehicle according to Embodiment 1.

A failure determination device, a brake control apparatus, and a method of determining a failure according to embodiments of the present disclosure are described in detail below with reference to the accompanying drawings. In the drawings, the components identical or corresponding to each other are provided with the same reference symbol.

Embodiment 1

The description of Embodiment 1 is directed to a failure determination device 1 to determine whether any failure occurs in air springs included in a railway vehicle, which is an example of a vehicle, and a brake control apparatus 10 including the failure determination device 1.

Figure 2:
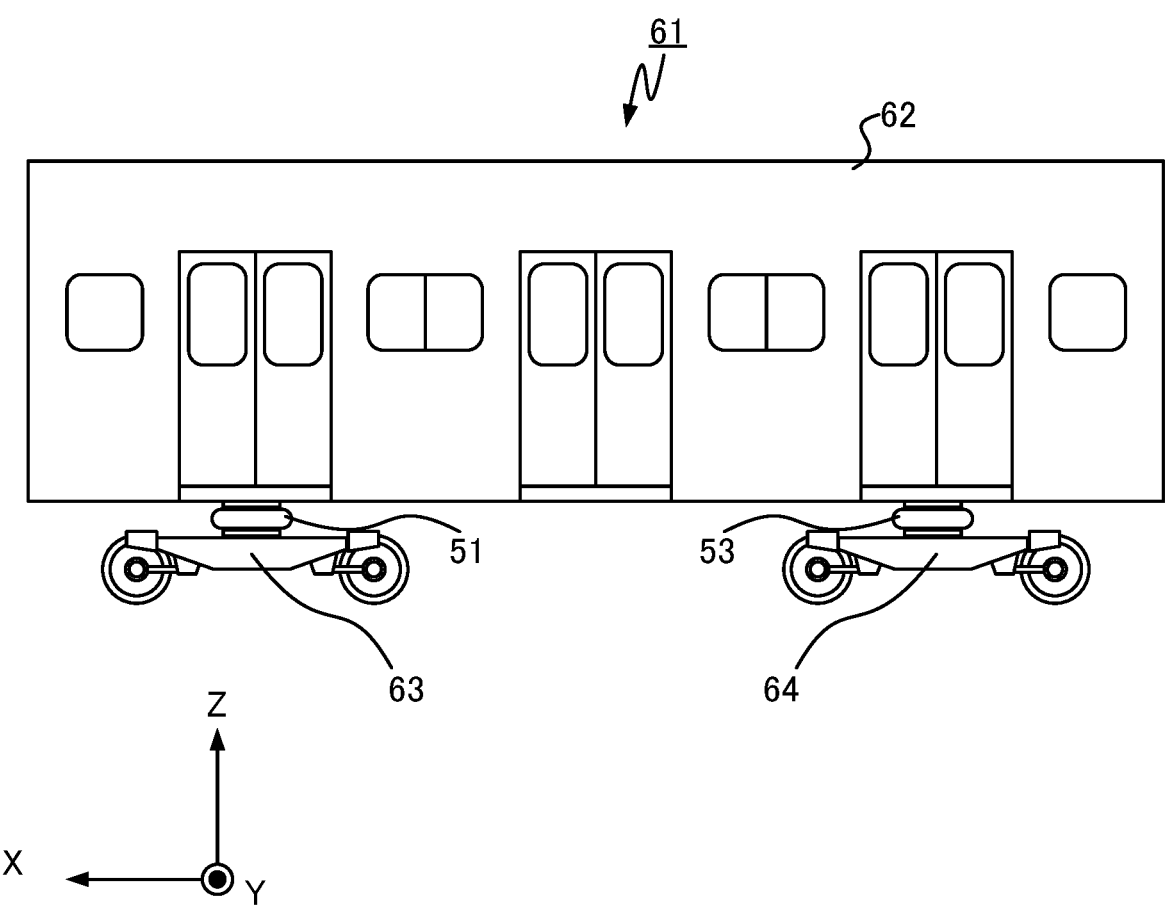
FIG. 2 is a side view of the vehicle according to Embodiment 1.
Figure 3:
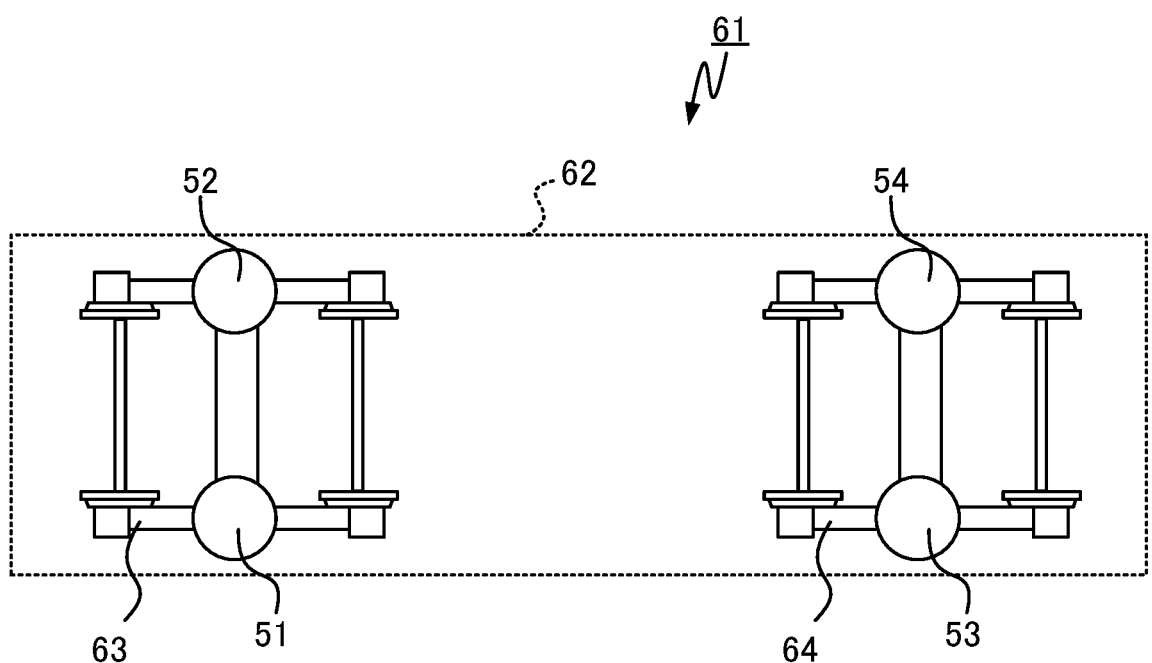
FIG. 3 is a top view of bogies according to Embodiment 1.

As illustrated in FIGS. 1 and 2, a vehicle 61, which is a railway vehicle, includes a vehicle body 62 and bogies 63 and 64 for supporting the vehicle body 62. As illustrated in FIG. 3, which is a top view of the bogies 63 and 64 as seen through the bottom of the vehicle body 62, the vehicle 61 includes air springs 51 and 52 provided to the bogie 63 and air springs 53 and 54 provided to the bogie 64. FIG. 3 illustrates the contour of the vehicle body 62 with a dotted line in order to clarify the positional relationship between the vehicle body 62 and the air springs 51, 52, 53, and 54.

In FIGS. 1 to 3, the X axis extends in the traveling direction of the vehicle 61, and the Y axis extends in the width direction of the vehicle 61. The Z axis is orthogonal to both of the X and Y axes. The vehicle 61 is assumed to be located on a horizontal ground in FIGS. 1 to 3. In other words, in FIGS. 1 to 3, the Z axis is parallel to a vertical axis AX extending vertically as illustrated with the dashed and single-dotted line in FIG. 1.

The individual components of the vehicle 61 are described below.

As illustrated in FIG. 3, the vehicle body 62 is supported at the four air springs 51, 52, 53, and 54 arranged two-dimensionally along both of the X and Y axes.

The bogies 63 and 64 are disposed under the floor of the vehicle body 62 and arranged in the traveling direction of the vehicle 61, that is, along the X axis. The bogies 63 and 64 have the identical structure. The bogie 63 is provided with the air springs 51 and 52 arranged in the width direction of the vehicle 61, that is, along the Y axis. The bogie 64 is provided with the air springs 53 and 54 arranged along the Y axis.

The air springs 51, 52, 53, and 54 illustrated in FIG. 3 have the identical structure. The air springs 51, 52, 53, and 54 are fed with air through pipes from an air tank, which is not illustrated. The feeding and discharge of air to and from the individual air springs 51, 52, 53, and 54 are conducted by an adjustment valve, which is not illustrated, leading to adjustment of the amount and pressure of air inside the air springs 51, 52, 53, and 54. This operation controls the distances between the vehicle body 62 and the respective bogies 63 and 64, thereby adjusting the inclination of the vehicle body 62.

Figure 4:
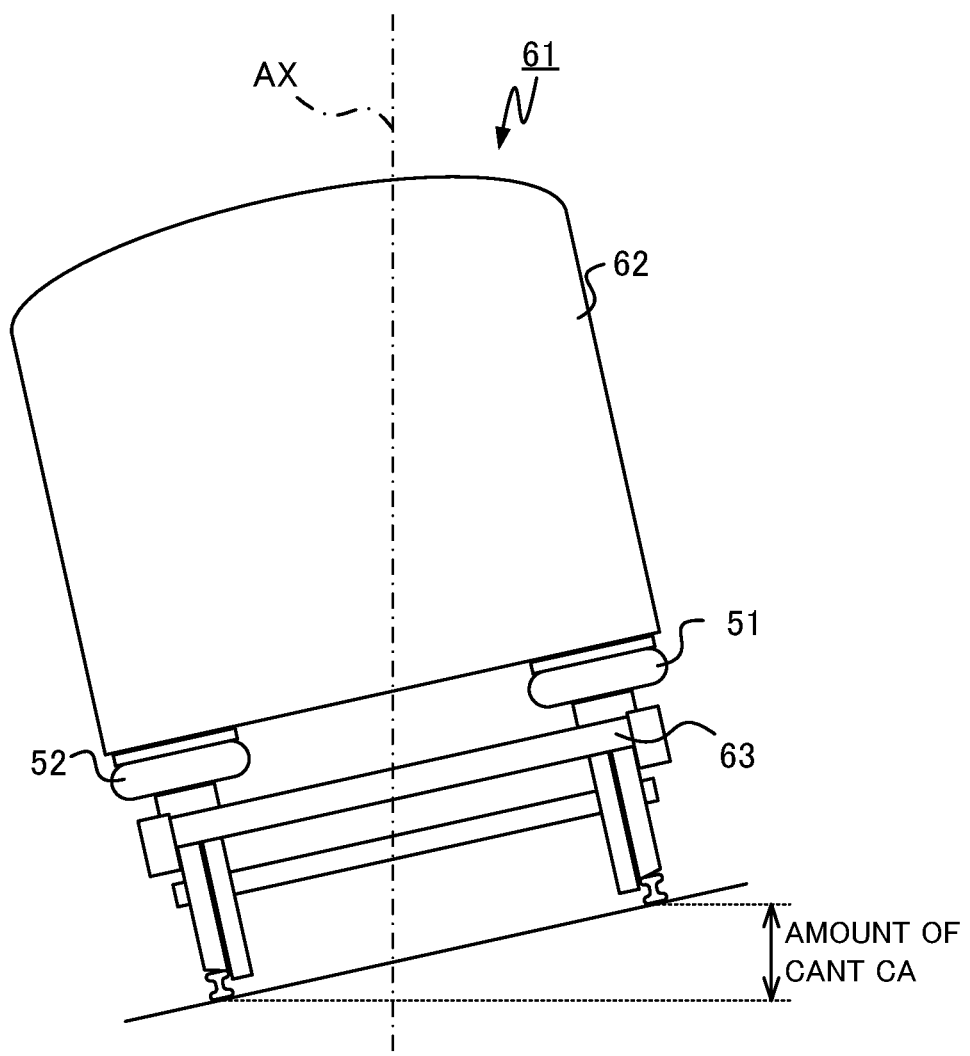
FIG. 4 is another front view of the vehicle according to Embodiment 1.

In a curved section of tracks for railway vehicles, the outer one of the curved rails is installed at a position higher than that of the inner one of the curved rails in order to allow railway vehicles to run stably. The vehicle 61 is thus located on an inclined ground in the curved section, as illustrated in FIG. 4. For example, when the vehicle 61 starts running on an inclined ground and the vertical position of the air spring 52 shifts to be lower than the vertical positions of the air springs 51, 53, and 54, the pressure value of the air spring 52 may become higher than that while the vehicle 61 is located on a horizontal ground.

In other words, while the vehicle 61 is located on an inclined ground as illustrated in FIG. 4, the pressure values of the air springs 51, 52, 53, and 54 inevitably vary despite of no abnormality in the air springs 51, 52, 53, and 54 and no change in the weight of the vehicle body 62 and the weights of passengers or loads on the vehicle body 62 from those while the vehicle 61 is located on a horizontal ground as illustrated in FIGS. 1 to 3. This variation causes differences in the pressure values of the air springs 51, 52, 53, and 54. The pressure values of the air springs 51, 52, 53, and 54 are the pressure values of air inside the air springs 51, 52, 53, and 54.

The pressure value of the air spring 52 at a lower position on an inclined ground in the example illustrated in FIG. 4 is higher than the pressure value of the air spring 52 in the example illustrated in FIG. 1. In contrast, the pressure value of the air spring 51 at an upper position on the inclined ground in the example illustrated in FIG. 4 is lower than the pressure value of the air spring 51 in the example illustrated in FIG. 1. As a result thereof, the increase in the pressure value of the air spring 52 at the lower position on the inclined ground in FIG. 4 and the decrease in the pressure value of the air spring 51 at the upper position on the inclined ground enhance the difference between the pressure values of the air springs 51 and 52.

Although FIG. 4 illustrates a ground inclined in the width direction of the vehicle 61, differences in the pressure values of the air springs 51, 52, 53, and 54 are also generated in the cases of a ground inclined in the traveling direction of the vehicle 61 and a ground inclined in both of the traveling direction and the width direction of the vehicle 61. The following description is directed to the failure determination device 1 that can determine whether any failure occurs in the air springs 51, 52, 53, and 54 regardless of the position of the vehicle 61, specifically, even while the vehicle 61 is located on an inclined ground.

Figure 5:
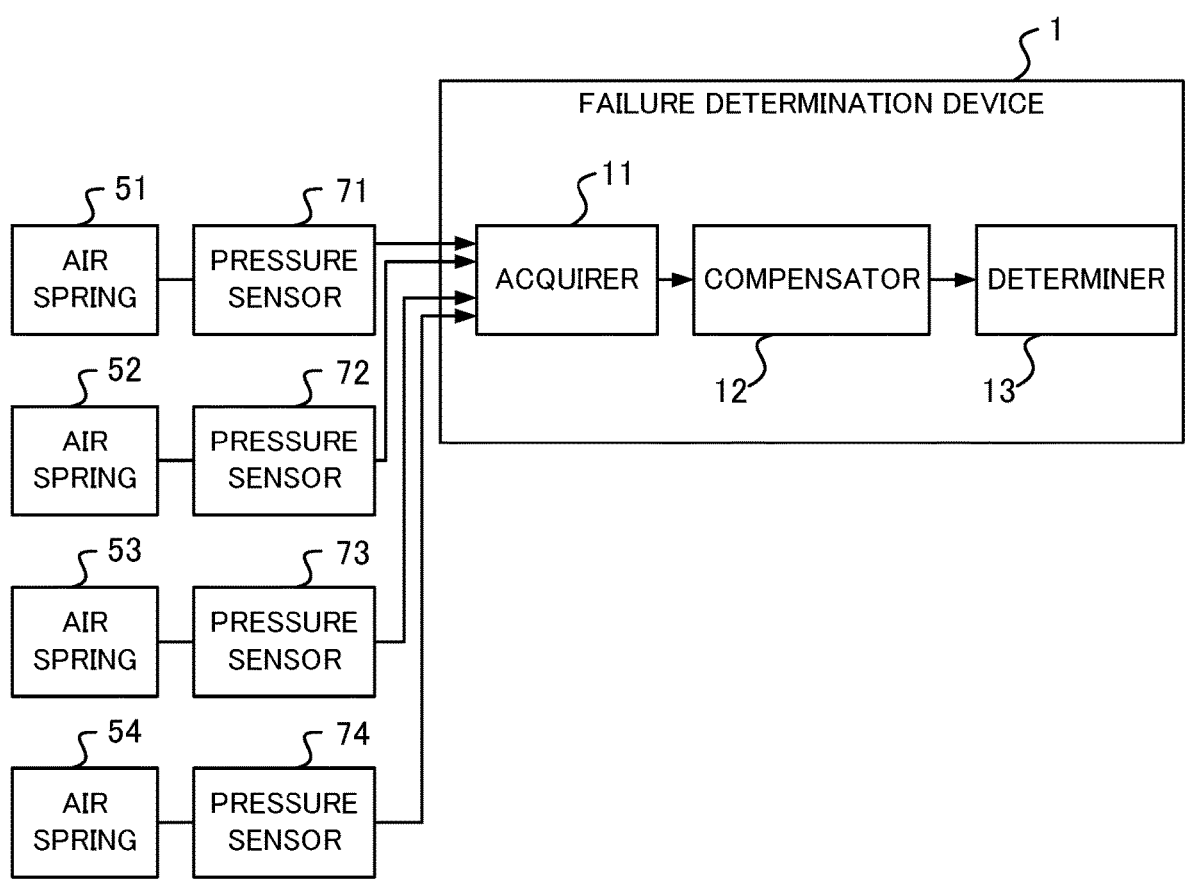
FIG. 5 is a block diagram illustrating a configuration of a failure determination device according to Embodiment 1.

The failure determination device 1 illustrated in FIG. 5 includes an acquirer 11 to acquire the pressure values of the air springs 51, 52, 53, and 54, a compensator 12 to perform compensation of the pressure values of the air springs 51, 52, 53, and 54 depending on the position of the vehicle 61, and a determiner 13 to determine whether any failure occurs in the air springs 51, 52, 53, and 54 based on the pressure values of the air springs 51, 52, 53, and 54 compensated by the compensator 12.

The individual components of the failure determination device 1 are described below.

The acquirer 11 acquires values measured by pressure sensors 71, 72, 73, and 74 for measuring the pressures of air inside the respective air springs 51, 52, 53, and 54. In detail, the pressure sensors 71, 72, 73, and 74 output electrical signals of which the voltages vary depending on the pressures of air inside the respective air springs 51, 52, 53, and 54. The acquirer 11 includes a voltage detecting circuit, for example, and thus acquires the values measured by the pressure sensors 71, 72, 73, and 74, that is, the pressure values of the air springs 51, 52, 53, and 54, from the electrical signals output from the pressure sensors 71, 72, 73, and 74. The acquirer 11 then provides the compensator 12 with the pressure values of the air springs 51, 52, 53, and 54. The pressure values of the air springs 51, 52, 53, and 54 are respectively referred to as AS1, AS2, AS3, and AS4.

The compensator 12 performs compensation of the pressure values AS1, AS2, AS3, and AS4 of the air springs 51, 52, 53, and 54 received from the acquirer 11 depending on the position of the vehicle 61, and then provides the determiner 13 with the compensated pressure values AS1', AS2', AS3', and AS4' of the air springs 51, 52, 53, and 54.

Specifically, the compensator 12 preferably performs compensation of the pressure values of the air springs 51, 52, 53, and 54 depending on whether the vehicle 61 is located on an inclined ground. For example, the compensator 12 preferably performs compensation of the pressure values AS1, AS2, AS3, and AS4 of the air springs 51, 52, 53, and 54 by linearly combining compensation values C1, C2, C3, and C4 (unit: kilopascal) and the pressure values (unit: kilopascal) of the air springs 51, 52, 53, and 54 respectively, as is represented by Expressions (1) to (4) below. The compensator 12 executing these operations can be achieved by an adder and a multiplier.

$$AS1'=k1*AS1+k2*C1 \qquad (1)$$

$$AS2'=k1*AS2+k2*C2 \qquad (2)$$

$$AS3'=k1*AS3+k2*C3 \qquad (3)$$

$$AS4'=k1*AS4+k2*C4 \qquad (4)$$

The coefficients k1 and k2 used in the linear combination in the above Expressions (1) to (4) can be appropriately determined in accordance with results of test runs or simulations, for example. In an exemplary case of k1=k2=1, the compensator 12 adds the compensation values C1, C2, C3, and C4 to the respective pressure values AS1, AS2, AS3, and AS4 of the air springs 51, 52, 53, and 54, and thereby performs compensation of the pressure values AS1, AS2, AS3, and AS4 of the air springs 51, 52, 53, and 54.

The compensation values C1, C2, C3, and C4 used in the above Expressions (1) to (4) are preferably defined as are represented by Expressions (5) to (8) below. In detail, when the vehicle 61 is located on an inclined ground, the absolute values of the compensation values C1, C2, C3, and C4 preferably have positive correlations with the inclination angle of the inclined ground. Specifically, when the vehicle 61 is located on an inclined ground, the absolute values of the compensation values C1, C2, C3, and C4 preferably have positive correlations with an amount of cant CA defined depending on the inclination angle of the inclined ground.

$$C1=a1*CA+b1 \qquad (5)$$

$$C2=a1*CA+b2 \qquad (6)$$

$$C3=a1*CA+b3 \qquad (7)$$

$$C4=a1*CA+b4 \qquad (8)$$

As illustrated in FIG. 4, the amount of cant CA is a positive value indicating the height difference (unit: millimeter) between the right and left rails at the position of the vehicle 61. In the above Expressions (5) to (8), the coefficients a1, a2, a3, and a4 and the coefficients b1, b2, b3, and b4 serve to convert the unit of the amount of cant CA represented in millimeter into the unit of the pressure values represented in kilopascal.

The coefficients a1, a2, a3, and a4 and the coefficients b1, b2, b3, and b4 are preferably defined depending on the positional relationships among the air springs 51, 52, 53, and 54. Specifically, the coefficients a1, a2, a3, and a4 and the coefficients b1, b2, b3, and b4 are preferably defined depending on the vertical positions of the respective air springs 51, 52, 53, and 54 at each position of the vehicle 61.

The compensator 12 performs compensation of the pressure values AS1, AS2, AS3, and AS4 of the air springs 51, 52, 53, and 54 using the compensation values C1, C2, C3, and C4 that are calculated based on the coefficients a1, a2, a3, and a4 and the coefficients b1, b2, b3, and b4 defined depending on the vertical positions of the respective air springs 51, 52, 53, and 54. The compensator 12 thereby decreases the pressure value of the air spring 52 at the lower position on the inclined ground and increases the pressure value of the air spring 51 at the upper position on the inclined ground.

In the example illustrated in FIG. 4, the vertical position of the air spring 52 at the lower position on the inclined ground is lower than the vertical position of the air spring 51 at the upper position on the inclined ground. The compensator 12 thus employs negative coefficients a2 and b2 to calculate the compensation value C2 for use in compensation of the pressure value AS2 of the air spring 52 at the lower vertical position, and employs positive coefficients a1 and b1 to calculate the compensation value C1 for use in compensation of the pressure value AS1 of the air spring 51 at the upper vertical position.

Specifically, the compensator 12 performs compensation to decrease the pressure value AS2 of the air spring 52 by calculating a compensation value C2 by applying negative coefficients a2 and b2 to the above Expression (6), and adding the calculated negative compensation value C2 to the pressure value AS2 of the air spring 52 as is represented by the above Expression (2). Also, the compensator 12 performs compensation to increase the pressure value AS1 of the air spring 51 by calculating a compensation value C1 by applying positive coefficients a1 and b1 to the above Expression (5), and adding the calculated positive compensation value C1 to the pressure value AS1 of the air spring 51 as is represented by the above Expression (1).

The compensator 12 preliminarily retains the amounts of cant CA associated with the positions of the vehicle 61 in a storage, which is not illustrated. The positions of the vehicle 61 are represented by the distances from the origin, for example, the starting station. The compensator 12 preliminarily retains the coefficients a1, a2, a3, and a4 and the coefficients b1, b2, b3, and b4 associated with the positions of the vehicle 61 and the traveling directions of the vehicle 61 in the storage. In this case, the compensator 12 acquires the position and the traveling direction of the vehicle 61 from a train information management system, which is not illustrated, for example, and then calculates an amount of cant CA, coefficients a1, a2, a3, and a4, and coefficients b1, b2, b3, and b4. The compensator 12 then performs compensation of the pressure values AS1, AS2, AS3, and AS4 of the air springs 51, 52, 53, and 54 through calculations using the above Expressions (1) to (8).

The determiner 13 determines whether any failure occurs in the air springs 51, 52, 53, and 54 based on the pressure values AS1', AS2', AS3', and AS4' of the air springs 51, 52, 53, and 54 compensated by the compensator 12.

In detail, the determiner 13 calculates a diagonal imbalance DU of the vehicle body 62. The diagonal imbalance DU of the vehicle body 62 is the absolute value of the difference between the sum of the pressure values AS1' and AS4' of the diagonal pair of air springs 51 and 54 compensated by the compensator 12 and the sum of the pressure values AS2' and AS3' of the other diagonal pair of air springs 52 and 53 compensated by the compensator 12, as is represented by Expression (9) below:

$$DU=|(AS1'+AS4')-(AS2'+AS3')| \qquad (9)$$

The determiner 13 then determines whether the diagonal imbalance DU is equal to or higher than a first threshold. When the diagonal imbalance DU is equal to or higher than the first threshold, any failure is deemed to occur in any of the air springs 51, 52, 53, and 54. In contrast, when the diagonal imbalance DU is lower than the first threshold, no failure is deemed to occur in the air springs 51, 52, 53, and 54. The first threshold is preliminarily defined to be higher than possible diagonal imbalances DU in the case of no failure in the air springs 51, 52, 53, and 54, in accordance with results of test runs or simulations. For example, the first threshold may be defined in accordance with the absolute value of the difference between the sum of the pressure values AS1 and AS4 of the diagonal pair of air springs 51 and 54 and the sum of the pressure values AS2 and AS3 of the other diagonal pair of air springs 52 and 53 while the vehicle 61 with no failure in the air springs 51, 52, 53, and 54 is located on a horizontal ground.

The determiner 13 executing the above operations can be achieved by an adder, a subtractor, an absolute value circuit, and a comparator.

The determiner 13 preferably outputs the result of determination indicating that any failure occurs in any of the air springs 51, 52, 53, and 54 when the diagonal imbalance DU is equal to or higher than the first threshold. For example, the determiner 13 may output this result of determination to the brake control apparatus 10, the train information management system, which is not illustrated, or an in-vehicle device installed in the vehicle 61, such as a display device at a cab.

Figure 6:
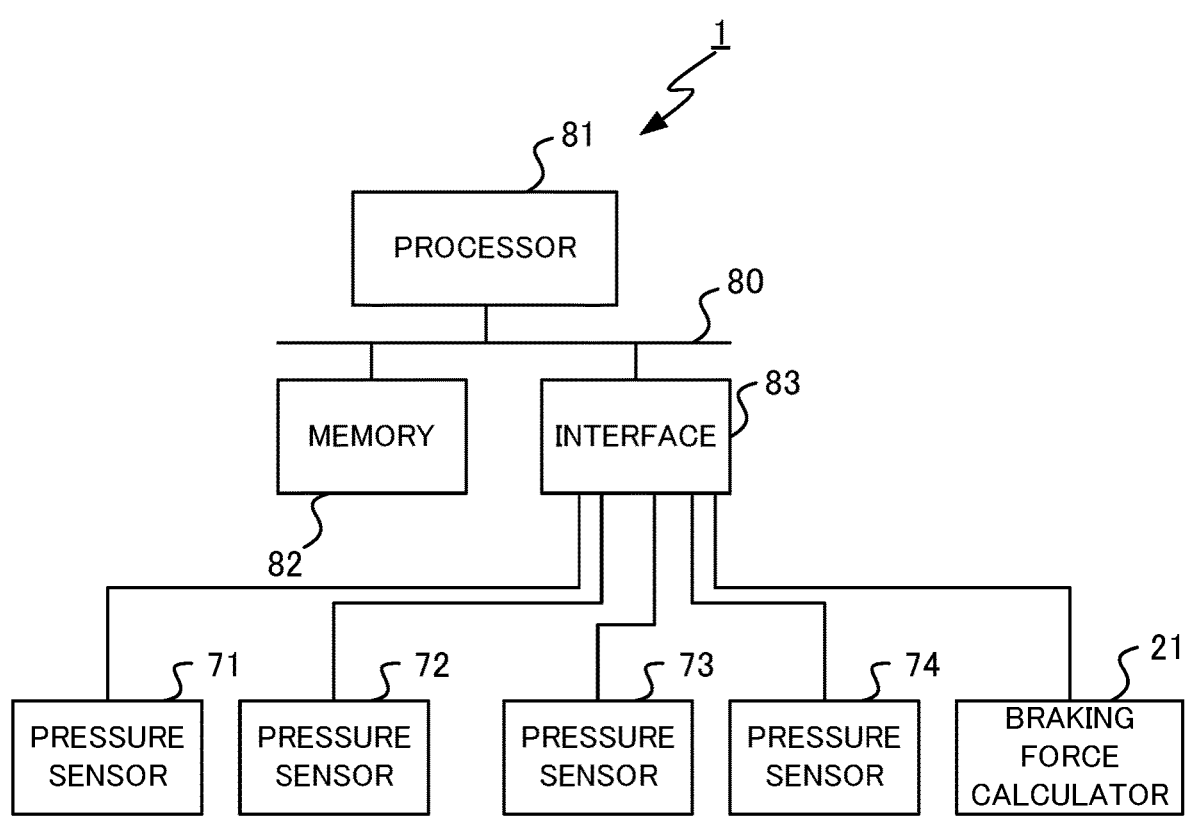
FIG. 6 is a block diagram illustrating a hardware configuration of the failure determination device according to Embodiment 1.

As illustrated in FIG. 6, the above-described failure determination device 1 has a hardware configuration including a processor 81, a memory 82, and an interface 83, to control the components. The processor 81, the memory 82, and the interface 83 are connected to each other via buses 80. The functions of the failure determination device 1 are achieved by the processor 81 executing programs stored in the memory 82. The interface 83 serves to connect the failure determination device 1 to an external device and establish communication. In detail, the failure determination device 1 is connected to the pressure sensors 71, 72, 73, and 74 via the interface 83. The failure determination device 1 is also connected to a braking force calculator 21 included in the brake control apparatus 10, which is described below, via the interface 83. The interface 83 may include multiple types of interface modules as required.

Although the failure determination device 1 includes a single processor 81 and a single memory 82 in FIG. 6, the failure determination device 1 may also include multiple processors 81 and multiple memories 82. In this case, the processors 81 and the memories 82 cooperate with each other and thereby perform the functions of the failure determination device 1.

Figure 7:
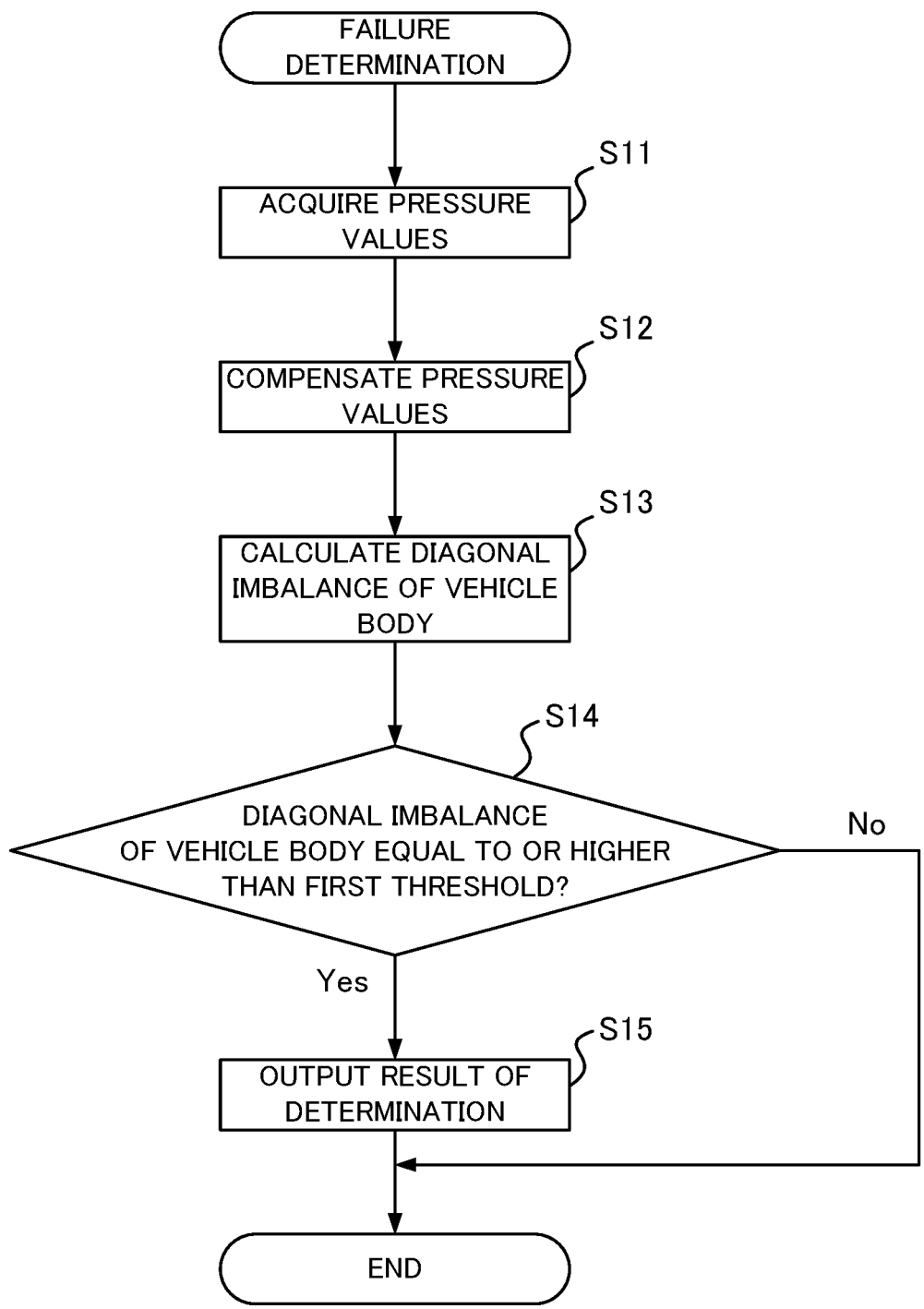
FIG. 7 is a flowchart illustrating an exemplary failure determining process executed by the failure determination device according to Embodiment 1.

The failure determination device 1 having the above-described configuration executes a process of determining whether any failure occurs in the air springs 51, 52, 53, and 54, as is described below with reference to FIG. 7. The failure determination device 1 initiates the process illustrated in FIG. 7 in response to start of running of the vehicle 61. The start of running of the vehicle 61 means, for example, the raising of the pantograph that causes electric power to be fed from a substation via an overhead wire to the vehicle 61 and thus enables the vehicle 61 to run.

The acquirer 11 acquires the pressure values AS1, AS2, AS3, and AS4 of the air springs 51, 52, 53, and 54 from the pressure sensors 71, 72, 73, and 74 (Step S11).

The compensator 12 then performs compensation of the pressure values AS1, AS2, AS3, and AS4 of the air springs 51, 52, 53, and 54 acquired in Step S11 depending on the position of the vehicle 61 (Step S12).

The determiner 13 then calculates a diagonal imbalance DU of the vehicle body 62 from the pressure values AS1', AS2', AS3', and AS4' of the air springs 51, 52, 53, and 54 compensated in Step S12 (Step S13). When the diagonal imbalance DU of the vehicle body 62 calculated in Step S13 is lower than the first threshold (Step S14; No), the failure determination device 1 skips Step S15 and terminates the failure determining process.

In contrast, when the diagonal imbalance DU of the vehicle body 62 calculated in Step S13 is equal to or higher than the first threshold (Step S14; Yes), the determiner 13 outputs the result of determination indicating that any failure occurs in any of the air springs 51, 52, 53, and 54 (Step S15).

The failure determination device 1 repeats the above-described process at predetermined intervals, and can therefore determine whether any failure occurs in the air springs 51, 52, 53, and 54 during running of the vehicle 61, even while the vehicle 61 is located on an inclined ground.

As described above, while the vehicle 61 is located on an inclined ground, differences are inevitably generated in the pressure values of the air springs 51, 52, 53, and 54, despite of no abnormality in the air springs 51, 52, 53, and 54 and no change in the weight of the vehicle body 62 and the weights of passengers or loads on the vehicle body 62. The pressure values of the air springs 51, 52, 53, and 54 are used to calculate a target braking force in the brake control apparatus 10. The brake control apparatus 10 preferably uses the pressure values of the air springs 51, 52, 53, and 54 compensated by the compensator 12 included in the failure determination device 1 for more accurate brake control. The following description is directed to the brake control apparatus 10 that includes the failure determination device 1 and executes brake control using the pressure values of the air springs 51, 52, 53, and 54 compensated in the failure determination device 1.

Figure 8:
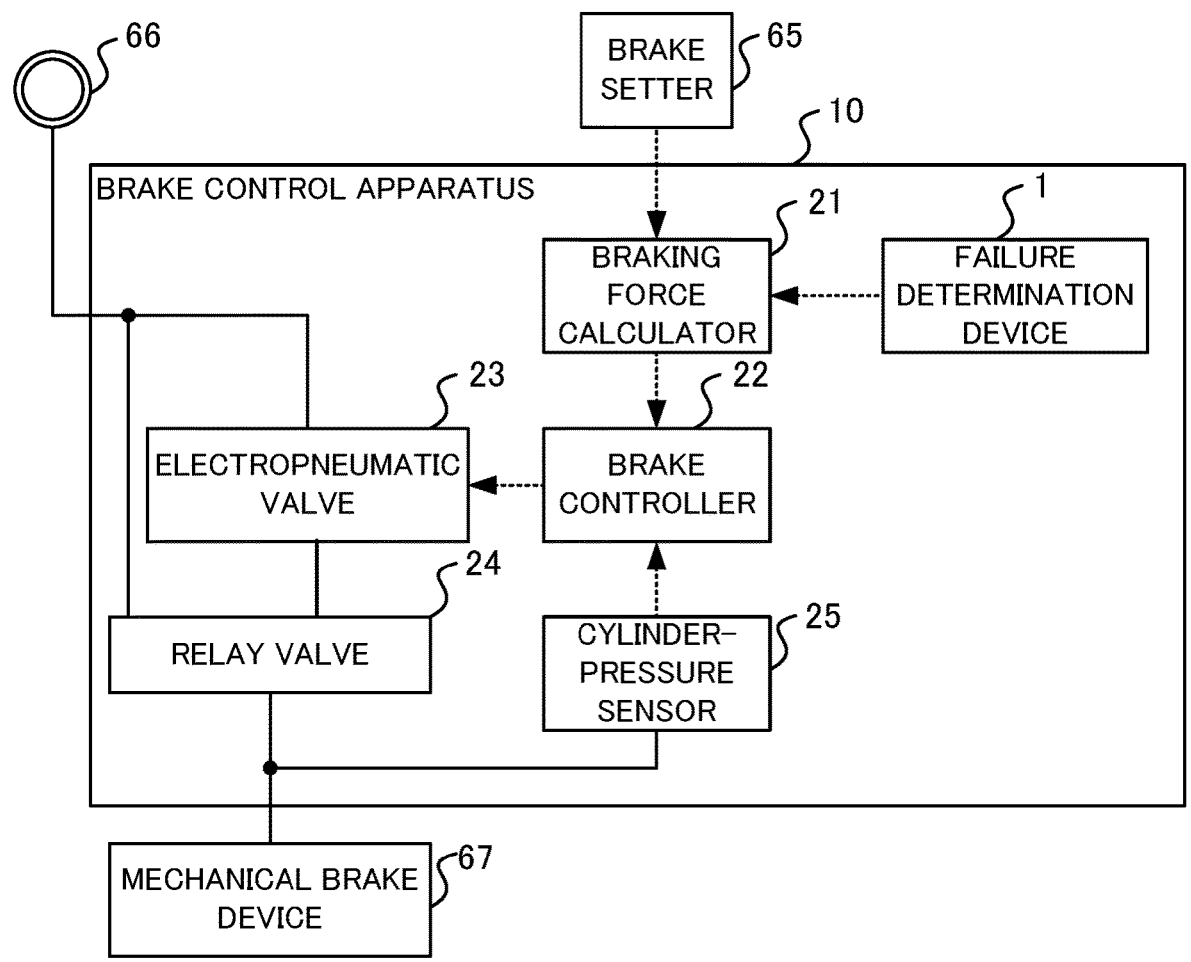
FIG. 8 is a block diagram illustrating a configuration of a brake control apparatus according to Embodiment 1.

The brake control apparatus 10 illustrated in FIG. 8 acquires a braking instruction from a brake setter 65 installed in the cab, adjusts the pressure of fluid fed from a fluid source 66 in accordance with the braking instruction, and causes the fluid having the adjusted pressure to be fed to a brake cylinder included in a mechanical brake device 67. In response to feeding of the fluid having the adjusted pressure to the brake cylinder, a piston included in the mechanical brake device 67 slides depending on the pressure in the brake cylinder. The sliding of the piston presses a brake shoe attached to the piston against a wheel of the vehicle 61, thereby generating a braking force and decelerating the vehicle 61. In Embodiment 1, the fluid fed from the fluid source 66 is air. FIG. 8 illustrates flows of air with solid lines, and electrical signals with dotted lines.

In detail, the brake control apparatus 10 includes the failure determination device 1, the braking force calculator 21 to calculate a target braking force based on the braking instruction acquired from the brake setter 65 and the pressure values of the air springs 51, 52, 53, and 54 compensated in the failure determination device 1, and a brake controller 22 to calculate a target pressure of air depending on the target braking force and control an electropneumatic valve 23 in accordance with the target pressure.

The brake control apparatus 10 further includes the electropneumatic valve 23 to adjust the pressure of air fed from the fluid source 66 depending on the target pressure and output the air at a designated pressure to a relay valve 24, the relay valve 24 to compress the air fed from the fluid source 66 in accordance with the designated pressure and feed the compressed air to the mechanical brake device 67, and a cylinder-pressure sensor 25 to measure the pressure value of the air fed from the relay valve 24 and provide the measured value to the brake controller 22.

The individual components of the brake control apparatus 10 are described below.

The failure determination device 1 includes the above-described configuration and provides the braking force calculator 21 with the pressure values AS1', AS2', AS3', and AS4' of the air springs 51, 52, 53, and 54 compensated by the compensator 12.

The braking force calculator 21 calculates a target braking force for achieving the target deceleration indicated by the braking instruction. In detail, the braking force calculator 21 calculates a total weight M1 that is the sum of the weight of the vehicle body 62 including the in-vehicle devices, the weights of passengers or loads on the vehicle body 62, and the weights of the bogies 63 and 64, from the compensated pressure values AS1', AS2', AS3', and AS4' of the air springs 51, 52, 53, and 54 acquired from the failure determination device 1, as is represented by Expression (10) below:

$$M1 = d1*(AS1'+AS2'+AS3'+AS4')/4 + M0 \quad (10)$$

In the above Expression (10), the coefficient d1 serves to convert the unit of the average of the compensated pressure values AS1', AS2', AS3', and AS4' of the air springs 51, 52, 53, and 54 represented in kilopascal into the unit of the weight represented in kilogram. The coefficient d1 is defined in accordance with the effective pressure-receiving areas of the air springs 51, 52, 53, and 54. The offset value M0 in the above Expression (10) is the sum of the weights of the bogies 63 and 64 and is defined in advance. The braking force calculator 21 preliminarily retains the coefficient d1 and the offset value M0.

The braking force calculator 21 then calculates a target braking force F1, from a target deceleration α1 indicated by the braking instruction acquired from the brake setter 65 and the total weight M1 calculated using the above Expression (10), as is represented by Expression (11) below:

$$F1 = \alpha 1 * M1 \quad (11)$$

The brake controller 22 then calculates a target pressing force of pressing a brake shoe included in the mechanical brake device 67 against a wheel of the vehicle 61 and thereby achieving the target braking force F1. In detail, the brake controller 22 preliminarily retains a friction coefficient μ1 at the contact surface between the brake shoe and the wheel, and divides the target braking force F1 by the friction coefficient μ1 to obtain a target pressing force N1, as is represented in Expression (12) below:

$$N1 = F1/\mu 1 \quad (12)$$

The brake controller 22 preliminarily retains an area 51 of the surface of the piston included in the mechanical brake device 67 orthogonal to the direction of sliding, and divides the target pressing force N1 by the area 51 of the surface of the piston orthogonal to the direction of sliding to obtain a target pressure P1 of the brake cylinder, as is represented by Expression (13) below:

$$P1 = N1/S1 \quad (13)$$

The brake controller 22 also executes feedback control that involves revising the calculated target pressure P1 depending on the pressure of the air fed from the relay valve 24 to the mechanical brake device 67, that is measured by the cylinder-pressure sensor 25. The brake controller 22 then outputs an electric signal indicating the revised target pressure P1' to the electropneumatic valve 23.

The electropneumatic valve 23 adjusts the pressure of the air fed from the fluid source 66 in accordance with the target pressure P1' indicated by the electric signal output from the brake controller 22, and then feeds the air having the adjusted pressure to the relay valve 24.

The relay valve 24 compresses the air fed from the fluid source 66 in accordance with the designated pressure that is the pressure of the air output from the electropneumatic valve 23, and then feeds the compressed air to the mechanical brake device 67.

The cylinder-pressure sensor 25 measures the pressure of the air fed from the relay valve 24, and provides the brake controller 22 with an electrical signal of which the voltage varies depending on the measured pressure of the air. The pressure of the air fed from the relay valve 24 corresponds to the pressure of the air inside the brake cylinder included in the mechanical brake device 67.

Since the air compressed by the brake control apparatus 10 is fed to the brake cylinder included in the mechanical brake device 67 as described above, the brake shoe is pressed against the wheel of the vehicle 61 and thus generates a braking force.

As described above, the failure determination device 1 according to Embodiment 1 performs compensation of the pressure values of the air springs 51, 52, 53, and 54 depending on the position of the vehicle 61, and determines whether any failure occurs in the air springs 51, 52, 53, and 54 based on the compensated pressure values of the air springs 51, 52, 53, and 54. The failure determination device 1 can therefore determine whether any failure occurs in the air springs 51, 52, 53, and 54 regardless of the position of the vehicle 61. In detail, the failure determination device 1 can determine occurrence of a failure in the air springs 51, 52, 53, and 54 even while the vehicle 61 is located on an inclined ground.

The brake control apparatus 10 uses the pressure values of the air springs 51, 52, 53, and 54 compensated by the compensator 12 included in the failure determination device 1 to calculate a target braking force. The brake control apparatus 10 can thus calculate the target braking force with high accuracy regardless of the position of the vehicle 61. The brake control apparatus 10 can therefore have improved accuracy of brake control.

Embodiment 2

Although the diagonal imbalance of the vehicle body 62 is employed to determine whether any failure occurs in the air springs 51, 52, 53, and 54 for supporting the vehicle body 62 in Embodiment 1, the diagonal imbalances of multiple vehicle bodies may also be employed to determine whether any failure occurs in springs for supporting each of the vehicle bodies. The description of Embodiment 2 is directed to a failure determination device 2 to determine whether any failure occurs in the air springs for supporting each of the vehicle bodies based on the diagonal imbalances of the vehicle bodies.

The individual components of the vehicle 61 according to Embodiment 2 are described below.

Figure 9:
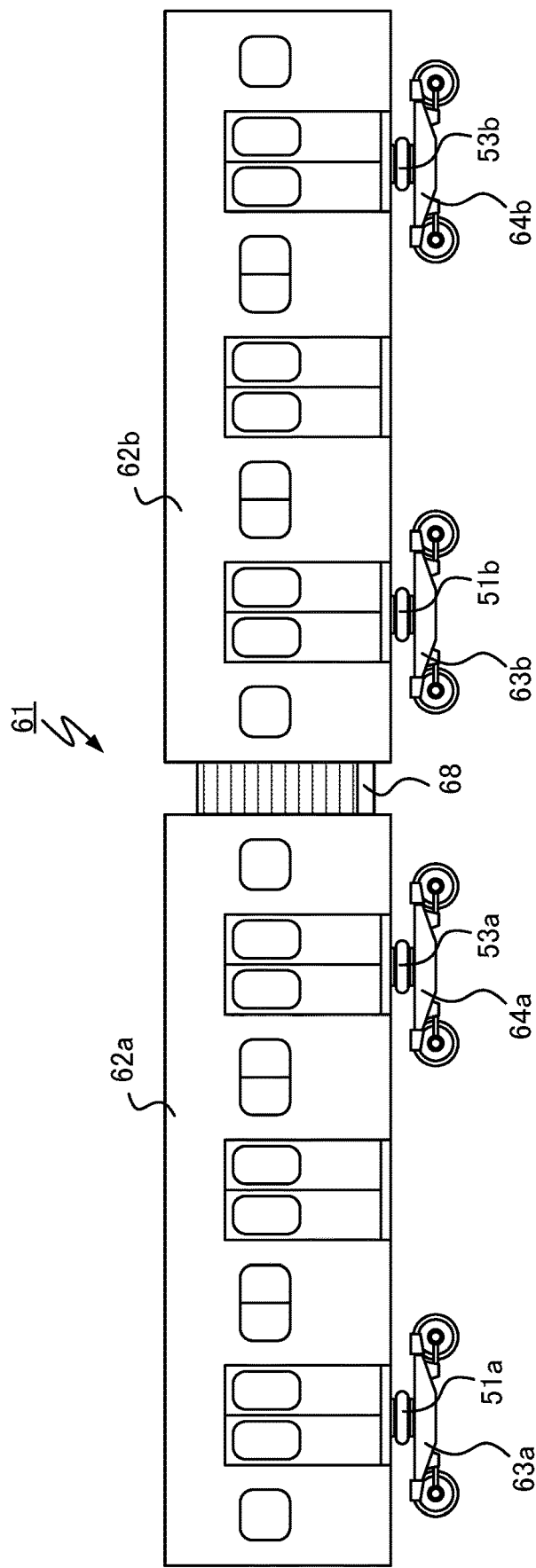
FIG. 9 is a side view of a vehicle according to Embodiment 2.

As illustrated in FIG. 9, the vehicle 61 includes vehicle bodies 62a and 62b, bogies 63a and 64a to support the vehicle body 62a, and bogies 63b and 64b to support the vehicle body 62b. The vehicle bodies 62a and 62b are connected to each other by a coupler 68.

Figure 10:
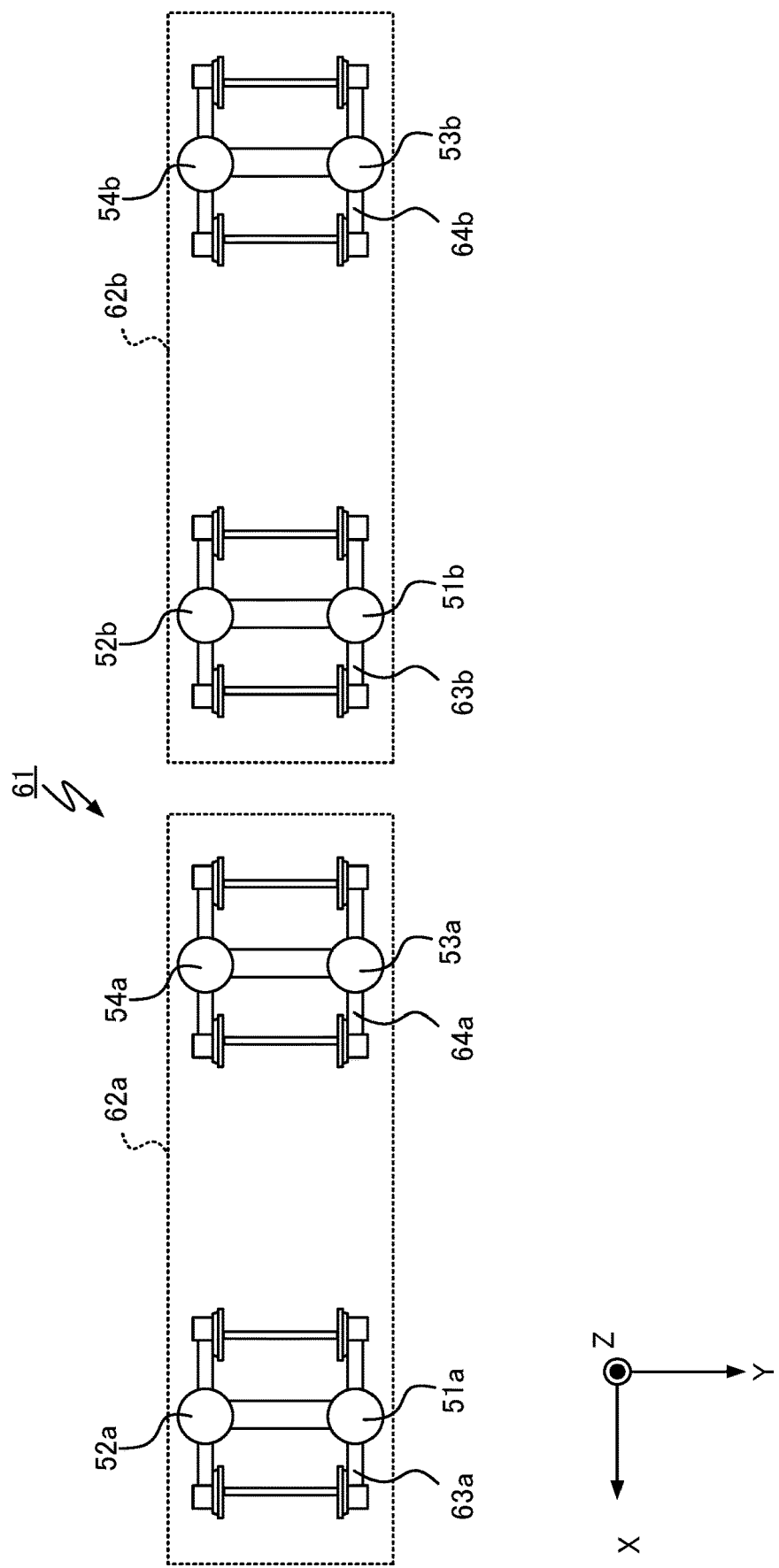
FIG. 10 is a top view of bogies according to Embodiment 2.

As illustrated in FIG. 10, which is a top view of the bogie 63a, 64a, 63b, and 64b as seen through the bottoms of the vehicle bodies 62a and 62b, the vehicle 61 includes air springs 51a and 52a provided to the bogie 63a, air springs 53a and 54a provided to the bogie 64a, air springs 51b and 52b provided to the bogie 63b, and air springs 53b and 54b provided to the bogie 64b. FIG. 10 illustrates the contours of the vehicle bodies 62a and 62b with dotted lines in order to clarify the positional relationship between the vehicle body 62a and the air springs 51a, 52a, 53a, and 54a and the positional relationship between the vehicle body 62b and the air springs 51b, 52b, 53b, and 54b.

The vehicle bodies 62a and 62b have the structure identical to that of the vehicle body 62 according to Embodiment 1. The bogies 63a, 64a, 63b, and 64b have the structure identical to that of the bogies 63 and 64 according to Embodiment 1. The bogie 63a is provided with the air springs 51a and 52a arranged along the Y axis. The bogie 64a is provided with the air springs 53a and 54a arranged along the Y axis. The bogie 63b is provided with the air springs 51b and 52b arranged along the Y axis. The bogie 64b is provided with the air springs 53b and 54b arranged along the Y axis.

The air springs 51a, 52a, 53a, 54a, 51b, 52b, 53b, and 54b have the structure identical to each other and identical to that of the air springs 51, 52, 53, and 54 according to Embodiment 1.

The following description is directed to the failure determination device 2 that can determine whether any failure occurs in the air springs 51a, 52a, 53a, 54a, 51b, 52b, 53b, and 54b even while the vehicle 61 having the above-described configuration is located on an inclined ground.

Figure 11:
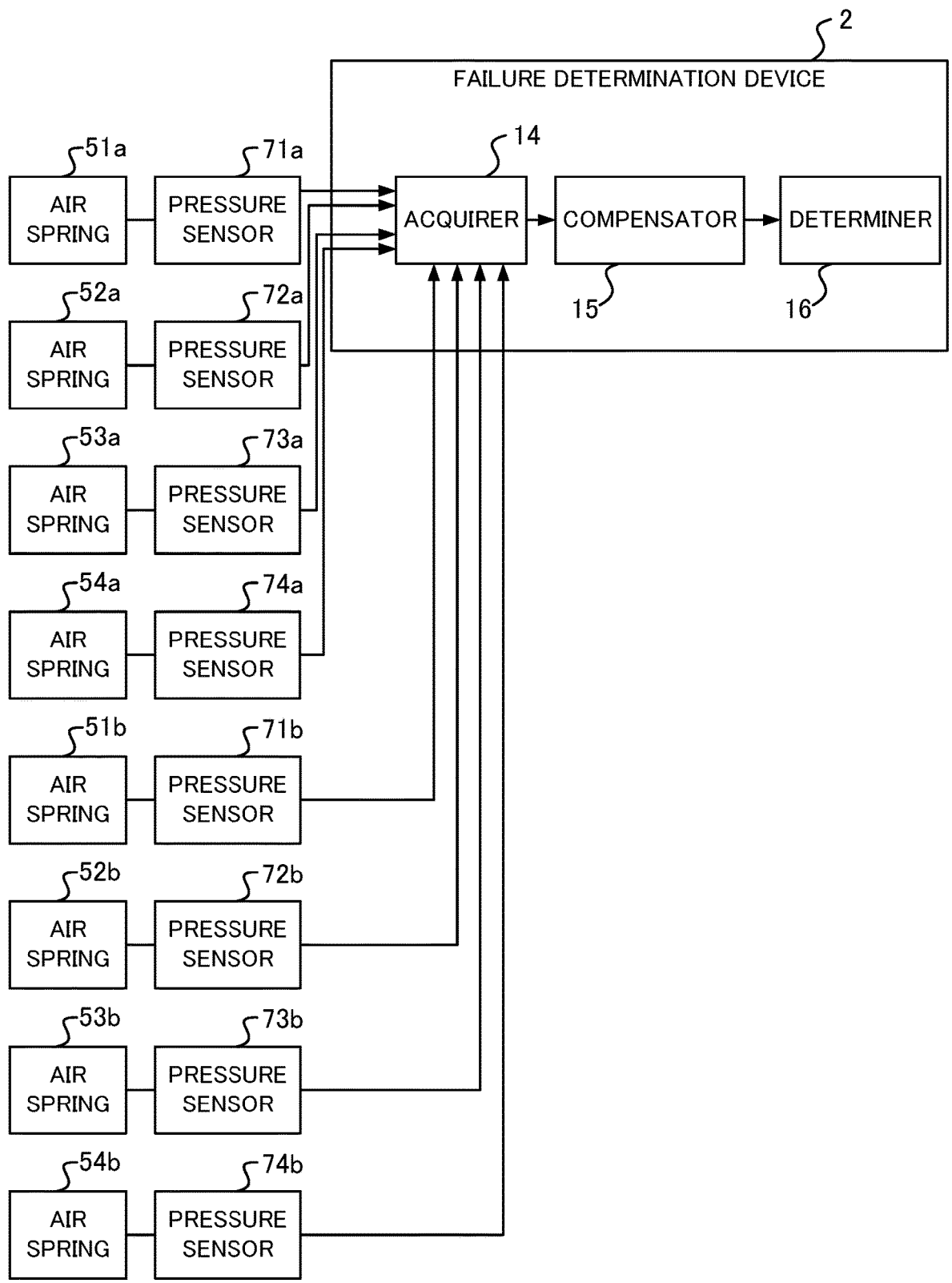
FIG. 11 is a block diagram illustrating a configuration of a failure determination device according to Embodiment 2.

The failure determination device 2 illustrated in FIG. 11 includes an acquirer 14 to acquire the pressure values of the air springs 51a, 52a, 53a, 54a, 51b, 52b, 53b, and 54b, a compensator 15 to perform compensation of the pressure values of the air springs 51a, 52a, 53a, 54a, 51b, 52b, 53b, and 54b depending on the position of the vehicle 61, and a determiner 16 to determine whether any failure occurs in the air springs 51a, 52a, 53a, 54a, 51b, 52b, 53b, and 54b based on the pressure values of the air springs 51a, 52a, 53a, 54a, 51b, 52b, 53b, and 54b compensated by the compensator 15.

The individual components of the failure determination device 2 are described below.

The acquirer 14 acquires values measured by the pressure sensors 71a, 72a, 73a, 74a, 71b, 72b, 73b, and 74b for measuring the pressures of air inside the respective air springs 51a, 52a, 53a, 54a, 51b, 52b, 53b, and 54b. The pressure sensors 71a, 72a, 73a, 74a, 71b, 72b, 73b, and 74b have the structure identical to each other and identical to that of the pressure sensors 71, 72, 73, and 74 according to Embodiment 1.

In detail, the pressure sensors 71a, 72a, 73a, 74a, 71b, 72b, 73b, and 74b output electrical signals of which the voltages vary depending on the pressures of air inside the respective air springs 51a, 52a, 53a, 54a, 51b, 52b, 53b, and 54b. The acquirer 14 then acquires the values measured by the pressure sensors 71a, 72a, 73a, 74a, 71b, 72b, 73b, and 74b, that is, the pressure values of the air springs 51a, 52a, 53a, 54a, 51b, 52b, 53b, and 54b, from the electrical signals output from the pressure sensors 71a, 72a, 73a, 74a, 71b, 72b, 73b, and 74b.

The acquirer 14 then provides the compensator 15 with the pressure values of the air springs 51a, 52a, 53a, 54a, 51b, 52b, 53b, and 54b. The pressure values of the air springs 51a, 52a, 53a, 54a, 51b, 52b, 53b, and 54b are respectively referred to as AS1a, AS2a, AS3a, AS4a, AS1b, AS2b, AS3b, and AS4b.

The compensator 15 performs compensation of the pressure values AS1a, AS2a, AS3a, AS4a, AS1b, AS2b, AS3b, and AS4b of the air springs 51a, 52a, 53a, 54a, 51b, 52b, 53b, and 54b received from the acquirer 14 depending on the position of the vehicle 61, and provides the determiner 16 with the compensated pressure values AS1a', AS2a', AS3a', AS4a', A1b', AS2b', AS3b', and AS4b' of the air springs 51a, 52a, 53a, 54a, 51b, 52b, 53b, and 54b.

The compensator 15 performs compensation of the pressure values AS1a, AS2a, AS3a, and AS4a of the air springs 51a, 52a, 53a, and 54a using the above Expressions (1) to (8), as in Embodiment 1. The compensator 15 also performs compensation of the pressure values AS1b, AS2b, AS3b, and AS4b of the air springs 51b, 52b, 53b, and 54b using the above Expressions (1) to (8), as in Embodiment 1. The compensator 15 executing these operations can be achieved by an adder and a multiplier.

The determiner 16 determines whether any failure occurs in the air springs 51a, 52a, 53a, 54a, 51b, 52b, 53b, and 54b based on the pressure values AS1a', AS2a', AS3a', AS4a', AS1b', AS2b', AS3b', and AS4b' of the air springs 51a, 52a, 53a, 54a, 51b, 52b, 53b, and 54b compensated by the compensator 15.

In detail, the determiner 16 calculates a diagonal imbalance DUa of the vehicle body 62a from the pressure values AS1a', AS2a', AS3a', and AS4a' of the air springs 51a, 52a, 53a, and 54a using the above Expression (9), as in Embodiment 1. The determiner 16 also calculates a diagonal imbalance DUb of the vehicle body 62b from the pressure values AS1b', AS2b', AS3b', and AS4b' of the air springs 51b, 52b, 53b, and 54b using the above Expression (9), as in Embodiment 1.

The determiner 16 then determines whether any failure occurs in the air springs 51a, 52a, 53a, 54a, 51b, 52b, 53b, and 54b, based on the dispersion between the diagonal imbalance DUa of the vehicle body 62a and the diagonal imbalance DUb of the vehicle body 62b. In detail, the determiner 16 determines whether the difference between the diagonal imbalance DUa of the vehicle body 62a and the diagonal imbalance DUb of the vehicle body 62b is equal to or higher than a difference threshold. When the difference between the diagonal imbalance DUa of the vehicle body 62a and the diagonal imbalance DUb of the vehicle body 62b is equal to or higher than the difference threshold, any failure is deemed to occur in any of the air springs 51a, 52a, 53a, 54a, 51b, 52b, 53b, and 54b.

In contrast, when the difference between the diagonal imbalance DUa of the vehicle body 62a and the diagonal imbalance DUb of the vehicle body 62b is lower than the difference threshold, no failure is deemed to occur in the air springs 51a, 52a, 53a, 54a, 51b, 52b, 53b, and 54b. The difference threshold is preliminarily defined to be higher than possible differences between the diagonal imbalance DUa of the vehicle body 62a and the diagonal imbalance DUb of the vehicle body 62b in the case of no failure in the air springs 51a, 52a, 53a, 54a, 51b, 52b, 53b, and 54b, in accordance with results of test runs or simulations.

The determiner 16 executing the above operations can be achieved by an adder, a subtractor, an absolute value circuit, and a comparator.

The determiner 16 preferably outputs the result of determination indicating that any failure occurs in any of the air springs 51a, 52a, 53a, 54a, 51b, 52b, 53b, and 54b when the difference between the diagonal imbalance DUa of the vehicle body 62a and the diagonal imbalance DUb of the vehicle body 62b is equal to or higher than the difference threshold. For example, the determiner 16 may transmit this result of determination to the brake control apparatus 10, the train information management system, which is not illustrated, or an in-vehicle device installed in the vehicle 61, such as a display device at the cab.

The above-described failure determination device 2 can be achieved by the hardware configuration similar to that of the failure determination device 1 according to Embodiment 1.

Figure 12:
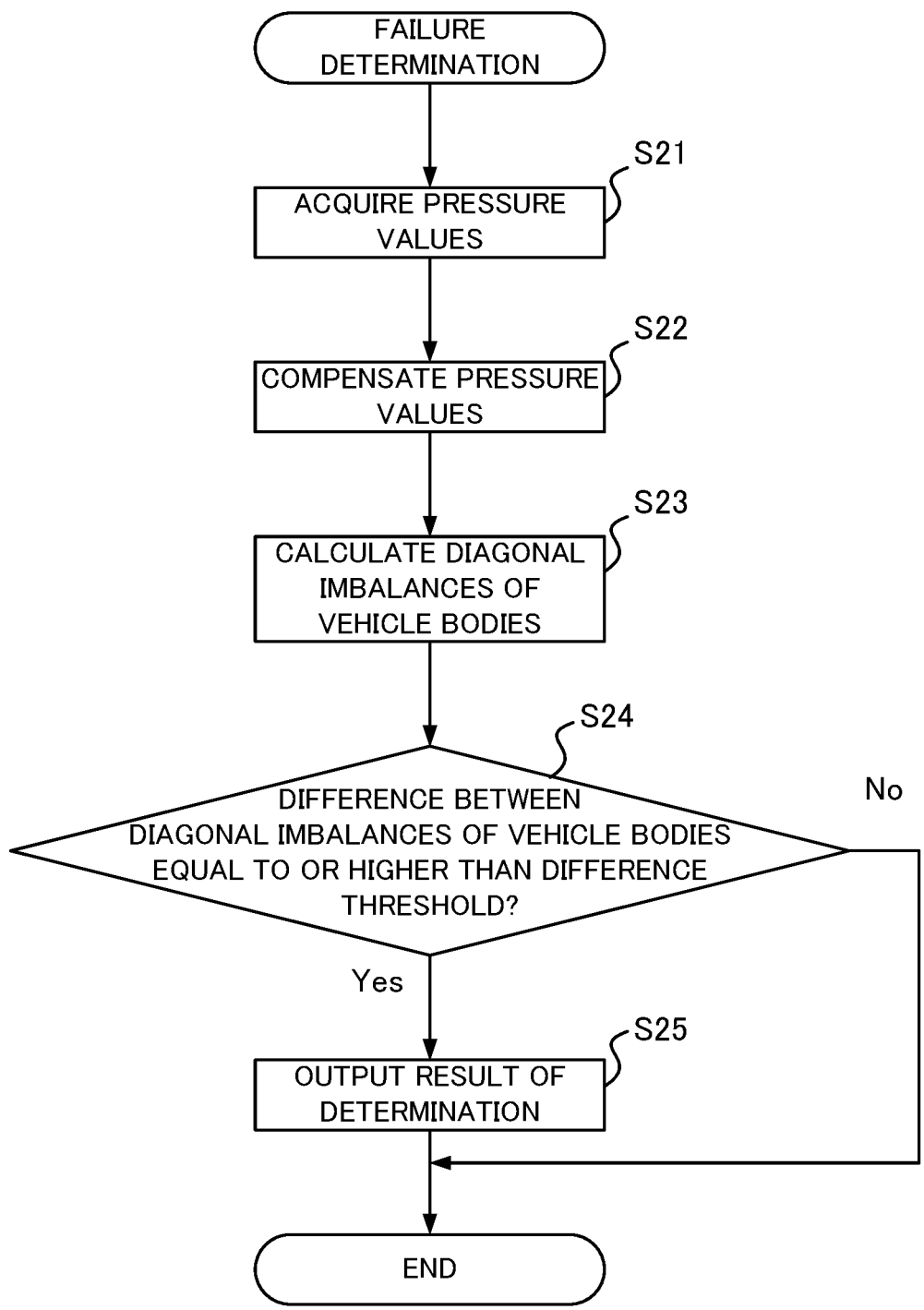
FIG. 12 is a flowchart illustrating an exemplary failure determining process executed by the failure determination device according to Embodiment 2.

The failure determination device 2 having the above-described configuration executes a process of determining whether any failure occurs in the air springs 51a, 52a, 53a, 54a, 51b, 52b, 53b, and 54b, as is described below with reference to FIG. 12. The failure determination device 2 initiates the process illustrated in FIG. 12 in response to start of running of the vehicle 61.

The acquirer 14 acquires the pressure values AS1a, AS2a, AS3a, AS4a, AS1b, AS2b, AS3b, and AS4b of the air springs 51a, 52a, 53a, 54a, 51b, 52b, 53b, and 54b from the pressure sensors 71a, 72a, 73a, 74a, 71b, 72b, 73b, and 74b (Step S21).

The compensator 15 then performs compensation of the pressure values AS1a, AS2a, AS3a, AS4a, AS1b, AS2b, AS3b, and AS4b of the air springs 51a, 52a, 53a, 54a, 51b, 52b, 53b, and 54b acquired in Step S21, depending on the position of the vehicle 61 (Step S22).

The determiner 16 then calculates a diagonal imbalance DUa of the vehicle body 62a and a diagonal imbalance DUb of the vehicle body 62b from the pressure values AS1a', AS2a', AS3a', AS4a', AS1b', AS2b', AS3b', and AS4b' of the air springs 51a, 52a, 53a, 54a, 51b, 52b, 53b, and 54b compensated in Step S22 (Step S23). When the difference between the diagonal imbalance DUa of the vehicle body 62a and the diagonal imbalance DUb of the vehicle body 62b is lower than the difference threshold (Step S24; No), the failure determination device 2 skips Step S25 and terminates the failure determining process.

In contrast, when the difference between the diagonal imbalance DUa of the vehicle body 62a and the diagonal imbalance DUb of the vehicle body 62b is equal to or higher than the difference threshold (Step S24; Yes), the determiner 16 outputs a result of determination indicating that any failure occurs in any of the air springs 51a, 52a, 53a, 54a, 51b, 52b, 53b, and 54b (Step S25).

The failure determination device 2 repeats the above-described process at predetermined intervals, and can therefore determine whether any failure occurs in the air springs 51a, 52a, 53a, 54a, 51b, 52b, 53b, and 54b during running of the vehicle 61, regardless of the position of the vehicle 61.

The brake control apparatus 10 has the configuration identical to that in Embodiment 1. The braking force calculator 21 included in the brake control apparatus 10 calculates target braking forces of the individual mechanical brake devices 67, based on the pressure values AS1a', AS2a', AS3a', AS4a', AS1b', AS2b', AS3b', and AS4b' of the air springs 51a, 52a, 53a, 54a, 51b, 52b, 53b, and 54b compensated by the compensator 15 included in the failure determination device 2.

As described above, the failure determination device 2 according to Embodiment 2 performs compensation of the pressure values of the air springs 51a, 52a, 53a, 54a, 51b, 52b, 53b, and 54b, depending on the position of the vehicle 61. The failure determination device 2 then calculates a diagonal imbalance DUa of the vehicle body 62a and a diagonal imbalance DUb of the vehicle body 62b from the compensated pressure values of the air springs 51a, 52a, 53a, 54a, 51b, 52b, 53b, and 54b, and determines whether any failure occurs in the air springs 51a, 52a, 53a, 54a, 51b, 52b, 53b, and 54b based on the dispersion between the diagonal imbalance DUa of the vehicle body 62a and the diagonal imbalance DUb of the vehicle body 62b. Since the dispersion between the diagonal imbalance DUa of the vehicle body 62a and the diagonal imbalance DUb of the vehicle body 62b is used to determine whether any failure occurs in the air springs 51a, 52a, 53a, 54a, 51b, 52b, 53b, and 54b, a failure can be determined with improved accuracy.

Figure 13:
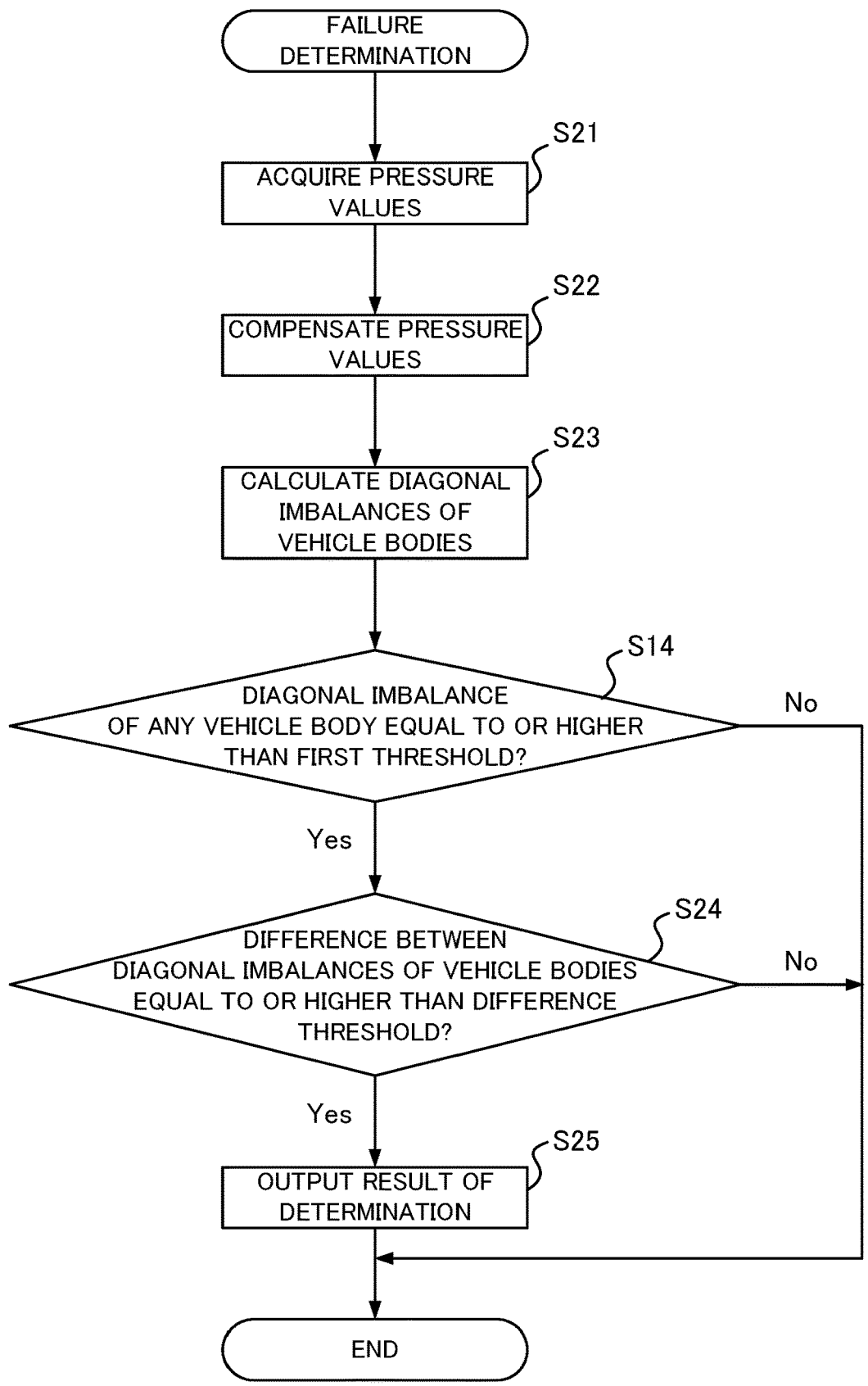
FIG. 13 is a flowchart illustrating another exemplary failure determining process executed by a failure determination device according to the embodiments.

The above-described embodiments are not intended to limit the present disclosure. These embodiments can be combined with each other. For example, the failure determination device 2 may execute the failure determining process illustrated in FIG. 13. In detail, after Steps S21 to S23 in FIG. 12, the determiner 16 included in the failure determination device 2 may determine whether the diagonal imbalance DUa of the vehicle body 62a is equal to or higher than the first threshold and also determine whether the diagonal imbalance DUb of the vehicle body 62b is equal to or higher than the first threshold, as in Embodiment 1 (Step S14).

When both of the diagonal imbalance DUa of the vehicle body 62a and the diagonal imbalance DUb of the vehicle body 62b are lower than the first threshold (Step S14; No), the failure determination device 2 skips Steps S24 and S25 and terminates the failure determining process. When either of the diagonal imbalance DUa of the vehicle body 62a and the diagonal imbalance DUb of the vehicle body 62b is equal to or higher than the first threshold (Step S14; Yes), and when the difference between the diagonal imbalance DUa of the vehicle body 62a and the diagonal imbalance DUb of the vehicle body 62b is lower than the difference threshold (Step S24; No), the failure determination device 2 skips Step S25 and terminates the failure determining process.

When either of the diagonal imbalance DUa of the vehicle body 62a and the diagonal imbalance DUb of the vehicle body 62b is equal to or higher than the first threshold (Step S14; Yes), and when the difference between the diagonal imbalance DUa of the vehicle body 62a and the diagonal imbalance DUb of the vehicle body 62b is equal to or higher than the difference threshold (Step S24; Yes), the determiner 16 outputs a result of determination indicating that any failure occurs in any of the air springs 51a, 52a, 53a, 54a, 51b, 52b, 53b, and 54b (Step S25).

The determiner 13 may determine whether any failure occurs in the air springs 51, 52, 53, and 54 by any procedure. For example, the determiner 13 may calculate a lateral imbalance WU of the vehicle body 62 as is represented by Expression (14) below, and determine whether the lateral imbalance WU is equal to or higher than a second threshold.

$$WU = |AS1 + AS3 - (AS2 + AS4)| \quad (14)$$

When the lateral imbalance WU is equal to or higher than the second threshold, any failure is deemed to occur in any of the air springs 51, 52, 53, and 54. In contrast, when the lateral imbalance WU is lower than the second threshold, no failure is deemed to occur in the air springs 51, 52, 53, and 54. The second threshold is preliminarily defined to be higher than possible lateral imbalances WU in the case of no failure in the air springs 51, 52, 53, and 54, in accordance with results of test runs or simulations.

Also, the determiner 16 may calculate a lateral imbalance WUa of the vehicle body 62a and a lateral imbalance WUb of the vehicle body 62b as is represented by the above Expression (14), and determine whether the difference between the lateral imbalance WUa of the vehicle body 62a and the lateral imbalance WUb of the vehicle body 62b is equal to or higher than a difference threshold.

The determiner 16 may determine whether any failure occurs in air springs for supporting three or more vehicle bodies based on the dispersion of diagonal imbalances or lateral imbalances of the vehicle bodies.

The dispersion of the diagonal imbalances used in determination of occurrence of a failure at the determiner 16 is not necessarily the difference between the diagonal imbalances. For example, the determiner 16 may determine whether the average of the diagonal imbalances of the vehicle bodies falls within a predetermined range. For another example, the determiner 16 may determine whether the maximum and minimum values of the diagonal imbalances of the vehicle bodies fall within a predetermined range.

The determiner 13 may include a timer and determine whether the diagonal imbalance DU has been equal to or higher than the first threshold for at least a predetermined duration. When the diagonal imbalance DU has been equal to or higher than the first threshold for at least the predetermined duration, any failure is deemed to occur in any of the air springs 51, 52, 53, and 54.

Also, the determiner 16 may include a timer and determine whether the difference between the diagonal imbalance DUa of the vehicle body 62a and the diagonal imbalance DUb of the vehicle body 62b has been equal to or higher than the difference threshold for at least a predetermined duration. When the difference between the diagonal imbalance DUa of the vehicle body 62a and the diagonal imbalance DUb of the vehicle body 62b has been equal to or higher than the difference threshold for at least the predetermined duration, any failure is deemed to occur in any of the air springs 51a, 52a, 53a, 54a, 51b, 52b, 53b, and 54b.

The above-mentioned compensation values employed in the compensators 12 and 15 are mere examples. For example, the compensators 12 and 15 may employ the inclination angle of an inclined ground on which the vehicle 61 is located as the cant CA, and thereby calculate compensation values C1, C2, C3, and C4. In this case, the coefficients a1, a2, a3, and a4 and the coefficients b1, b2, b3, and b4 serve to convert the unit of the angle into the unit of the pressure values represented in kilopascal.

The vehicle 61 runs at a low speed in a garage provided with a railway turnout. Since the pressure values of the air springs 51, 52, 53, and 54 tend to have differences during running on the railway turnout, the determiner 13 may execute the failure determining process only when the speed of the vehicle 61 is equal to or higher than a speed threshold. The speed threshold is preliminarily defined to be higher than the speed of the vehicle 61 running in a garage.

The braking force calculator 21 may calculate the total weight M1 from the pressure values of the air springs 51, 52, 53, and 54 by any procedure other than the above Expression (10). For example, the braking force calculator 21 may calculate the total weight M1 using any of Expressions (15) to (18) below:

$$M1 = d1*(AS1'+AS2')/2 + M0 \quad (15)$$

$$M1 = d1*(AS1'+AS3')/2 + M0 \quad (16)$$

$$M1 = d1*(AS1'+AS4')/2 + M0 \quad (17)$$

$$M1 = d1*(AS1'+AS2'+AS3')/3 + M0 \quad (18)$$

The braking force calculator 21 may acquire the result of determination from the determiners 13 and 16 included in the failure determination devices 1 and 2. For example, the braking force calculator 21, when acquiring the result of determination indicating occurrence of a failure, may calculate a target braking force from the initial value of the total weight M1. In this case, the braking force calculator 21 preliminarily retains the initial value of the total weight M1.

Although the vehicle 61 according to Embodiment 1 includes a single vehicle body 62, the vehicle 61 may also include multiple vehicle bodies 62. In this case, the failure determination device 1 determines whether any failure occurs in the air springs 51, 52, 53, and 54 in each of the vehicle bodies 62, based on the pressure values of the air springs 51, 52, 53, and 54 for supporting each of the vehicle bodies 62.

In this case, the braking force calculator 21, when acquiring the result of determination indicating occurrence of a failure from the determiner 13 included in the failure determination device 1, may calculate a target braking force from the pressure values of the air springs 51, 52, 53, and 54 for supporting one of the vehicle bodies 62 having no failure.

The failure determination devices 1 and 2 may be installed in the vehicle 61 or installed outside the vehicle 61, for example, in a direction center. The failure determination devices 1 and 2 may also be achieved in the form of a function of the train information management system.

The above-described vehicle 61 is a mere example. For example, the vehicle 61 is not necessarily a railway vehicle and may be any moving body that can travel on an inclined ground. For another example, the vehicle 61 may include two vehicle bodies 62a and 62b and three bogies 63a, 63b, and 64a. In this case, the bogie 63b is a connecting bogie to support the two vehicle bodies 62a and 62b.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2 Failure determination device
10 Brake control apparatus
11, 14 Acquirer
12, 15 Compensator
13, 16 Determiner
21 Braking force calculator
22 Brake controller
23 Electropneumatic valve
24 Relay valve
25 Cylinder-pressure sensor
51, 52, 53, 54, 51a, 52a, 53a, 54a, 51b, 52b, 53b, 54b Air spring
61 Vehicle
62, 62a, 62b Vehicle body
63, 64, 63a, 64a, 63b, 64b Bogie
65 Brake setter
66 Fluid source
67 Mechanical brake device
68 Coupler
71, 72, 73, 74, 71a, 72a, 73a, 74a, 71b, 72b, 73b, 74b Pressure sensor
80 Bus
81 Processor
82 Memory
83 Interface
AX Vertical axis

The invention claimed is:

1. A failure determination device comprising:
   acquiring circuitry to acquire pressure values of air springs from pressure sensors, the air springs being provided to a bogie included in a vehicle to support a vehicle body included in the vehicle, the pressure values being values measured by the pressure sensors, the pressure sensors measuring pressures of air inside the air springs;
   compensating circuitry to perform, depending on a position of the vehicle, compensation of the pressure values of the air springs acquired by the acquiring circuitry; and
   determining circuitry to determine, based on the pressure values of the air springs compensated by the compensating circuitry, whether any failure occurs in the air springs.

2. The failure determination device according to claim 1, wherein the compensating circuitry performs compensation of the pressure values of the air springs depending on whether the vehicle is located on an inclined ground.

3. The failure determination device according to claim 2, wherein in a case in which the vehicle is located on the inclined ground, the compensating circuitry performs compensation of the pressure values of the air springs using compensation values of which absolute values have positive correlations with an inclination angle of the inclined ground.

4. The failure determination device according to claim 3, wherein the compensating circuitry performs compensation of the respective pressure values of the air springs by linearly combining the compensation values and the respective pressure values of the air springs.

5. The failure determination device according to claim 3, wherein the compensating circuitry performs compensation of the respective pressure values of the air springs using the compensation values defined for the respective air springs in accordance with mutual positional relationships among the air springs.

6. The failure determination device according to claim 4, wherein the compensating circuitry performs compensation of the respective pressure values of the air springs using the compensation values defined for the respective air springs in accordance with mutual positional relationships among the air springs.

7. The failure determination device according to claim 3, wherein in a case in which the vehicle is located on the inclined ground, the compensating circuitry performs compensation to decrease a pressure value of one air spring among the air springs and increase a pressure value of another air spring among the air springs, the one air spring being located at a lower position on the inclined ground, the another air spring being located at an upper position on the inclined ground.

8. The failure determination device according to claim 4, wherein in a case in which the vehicle is located on the inclined ground, the compensating circuitry performs compensation to decrease a pressure value of one air spring among the air springs and increase a pressure value of another air spring among the air springs, the one air spring being located at a lower position on the inclined ground, the another air spring being located at an upper position on the inclined ground.

9. The failure determination device according to claim 5, wherein in a case in which the vehicle is located on the inclined ground, the compensating circuitry performs compensation to decrease a pressure value of one air spring among the air springs and increase a pressure value of another air spring among the air springs, the one air spring being located at a lower position on the inclined ground, the another air spring being located at an upper position on the inclined ground.

10. The failure determination device according to claim 6, wherein in a case in which the vehicle is located on the inclined ground, the compensating circuitry performs compensation to decrease a pressure value of one air spring among the air springs and increase a pressure value of another air spring among the air springs, the one air spring being located at a lower position on the inclined ground, the another air spring being located at an upper position on the inclined ground.

11. The failure determination device according to claim 1, wherein
   the air springs include four air springs in each vehicle body for supporting the vehicle body, the four air springs being arranged two-dimensionally in both of a traveling direction and a width direction of the vehicle, and
   the determining circuitry determines, based on pressure values of the four air springs compensated by the compensating circuitry, whether any failure occurs in the four air springs, the four air springs supporting the same vehicle body.

12. The failure determination device according to claim 2, wherein
   the air springs include four air springs in each vehicle body for supporting the vehicle body, the four air springs being arranged two-dimensionally in both of a traveling direction and a width direction of the vehicle, and
   the determining circuitry determines, based on pressure values of the four air springs compensated by the compensating circuitry, whether any failure occurs in the four air springs, the four air springs supporting the same vehicle body.

13. The failure determination device according to claim 11, wherein
   the determining circuitry
      calculates a diagonal imbalance of the vehicle body based on the pressure values of the four air springs compensated by the compensating circuitry, the diagonal imbalance being an absolute value of a difference between a sum of pressure values of a diagonal pair of air springs among the four air springs compensated by the compensating circuitry and a sum of pressure values of the other diagonal pair of air springs among the four air springs compensated by the compensating circuitry, and
      determines, based on the calculated diagonal imbalance of the vehicle body, whether any failure occurs in the four air springs.

14. The failure determination device according to claim 12, wherein
   the determining circuitry
      calculates a diagonal imbalance of the vehicle body based on the pressure values of the four air springs compensated by the compensating circuitry, the diagonal imbalance being an absolute value of a difference between a sum of pressure values of a diagonal pair of air springs among the four air springs compensated by the compensating circuitry and a sum of pressure values of the other diagonal pair of air springs among the four air springs compensated by the compensating circuitry, and determines, based on the calculated diagonal imbalance of the vehicle body, whether any failure occurs in the four air springs.

15. The failure determination device according to claim 13, wherein
the vehicle includes a plurality of the vehicle bodies, and
for each of the plurality of vehicle bodies, the determining circuitry
calculates a diagonal imbalance of the vehicle body based on the pressure values of the four air springs compensated by the compensating circuitry, the four air springs supporting the vehicle body, and
determines, based on the calculated diagonal imbalance of the vehicle body, whether any failure occurs in the four air springs supporting the vehicle body.

16. The failure determination device according to claim 14, wherein
the vehicle includes a plurality of the vehicle bodies, and
for each of the plurality of vehicle bodies, the determining circuitry
calculates a diagonal imbalance of the vehicle body based on the pressure values of the four air springs compensated by the compensating circuitry, the four air springs supporting the vehicle body, and
determines, based on the calculated diagonal imbalance of the vehicle body, whether any failure occurs in the four air springs supporting the vehicle body.

17. A brake control apparatus that controls a brake device for generating a braking force to decelerate a vehicle, the brake control apparatus comprising:
the failure determination device according to claim 1;
braking force calculating circuitry to acquire a braking instruction indicating a target deceleration of the vehicle, and calculate a target braking force based on the target deceleration and the pressure values of the air springs compensated by the compensating circuitry included in the failure determination device, the target braking force being for achieving the target deceleration; and
brake controlling circuitry to control the brake device in accordance with the target braking force calculated by the braking force calculator.

18. A method for determining a failure, the method comprising:
performing, depending on a position of a vehicle, compensation of pressure values of air springs received from pressure sensors to measure pressures of air inside the air springs, the air springs being provided to a bogie included in the vehicle and supporting a vehicle body included in the vehicle, the pressure values of the air springs being values measured by the pressure sensors; and
determining, based on the compensated pressure values of the air springs, whether any failure occurs in the air springs.

* * * * *